(12) United States Patent
Inoue et al.

(10) Patent No.: US 12,470,112 B2
(45) Date of Patent: Nov. 11, 2025

(54) INTEGRATED UNIT

(71) Applicant: HONDA MOTOR CO., LTD., Tokyo (JP)

(72) Inventors: Takashi Inoue, Tokyo (JP); Shinichi Yataka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 18/136,022

(22) Filed: Apr. 18, 2023

(65) Prior Publication Data

US 2023/0361657 A1 Nov. 9, 2023

(30) Foreign Application Priority Data

May 6, 2022 (JP) ................. 2022-076520

(51) Int. Cl.
*H02K 11/33* (2016.01)
*H02K 5/22* (2006.01)

(52) U.S. Cl.
CPC .............. *H02K 11/33* (2016.01); *H02K 5/22* (2013.01)

(58) Field of Classification Search
CPC .......... H02K 11/33; H02K 5/22; H02K 5/225; H02K 5/24; H02K 5/26
USPC ....................................... 310/68 R
See application file for complete search history.

(56) References Cited

U.S. PATENT DOCUMENTS

| 2009/0206709 A1* | 8/2009 | Kakuda | H02K 5/15 |
| | | | 310/68 D |
| 2016/0218584 A1* | 7/2016 | Fukushima | H02K 5/225 |
| 2016/0248302 A1* | 8/2016 | Nagao | H02K 5/225 |

FOREIGN PATENT DOCUMENTS

| JP | 2009-274511 A | 11/2009 |
| JP | 2016-140200 A | 8/2016 |
| JP | 2019-081442 A | 5/2019 |
| JP | 2021-126014 A | 8/2021 |

OTHER PUBLICATIONS

Oct. 31, 2023, translation of Japanese Office Action issued for related JP Application No. 2022-076520.

* cited by examiner

*Primary Examiner* — Alexander A Singh
*Assistant Examiner* — Charlie Frank Mann, Jr.
(74) *Attorney, Agent, or Firm* — Paratus Law Group, PLLC

(57) ABSTRACT

An integrated unit, includes a drive device, and a control device which is fixed to the drive device and is configured to control the drive device. The control device includes a guide pin protruding toward the drive device. The drive device includes a guide hole through which the guide pin is inserted. The control device is fixed to the drive device with the guide pin inserted through the guide hole. The drive device includes a protective wall which covers at least a part of the guide pin with the control device fixed to the drive device.

6 Claims, 11 Drawing Sheets

INTEGRATED UNIT

CROSS-REFERENCE RELATED ARTS

This application is based on and claims priority under 35 USC 119 from Japanese Patent Application No. 2022-076520 filed on May 6, 2022.

TECHNICAL FIELD

The present disclosure relates to an integrated unit. In particular, the present disclosure relates to an integrated unit in which a drive device and a control device for controlling the drive device are integrated.

BACKGROUND ART

In recent years, efforts to realize a low-carbon society or a decarbonized society become active, and research and development of electric vehicles and hybrid vehicles are conducted to reduce CO2 emission and improve energy efficiency in vehicles. Generally, an electric vehicle or a hybrid vehicle includes a drive device including an electric motor as a drive source, and a control device which controls the drive device. In order to expand spaces of a passenger compartment and a luggage compartment of these types of electric vehicles and hybrid vehicles, there is a demand for further miniaturization of the drive device and the control device.

For example, JP2016-140200A describes an integrated unit including a drive device provided with an electric motor and a control device which is configured to control the drive device, in which the drive device and the control device are integrated by bolt-fastening the control device to the drive device. In the integrated unit described in JP2016-140200A, the control device is provided with a guide pin protruding from a bottom surface of the control device, and the drive device is provided with a guide hole through which the guide pin is inserted. By inserting the guide pin through the guide hole, a relative position between the control device and the drive device is regulated, which makes it easy to bolt-fastening the control device to the drive device.

However, since the guide pin is exposed to the outside of the integrated unit, when the integrated unit of JP2016-140200A is used while being mounted on a vehicle or the like, for example, water or salt water may adhere to the guide pin, and then the guide pin may be rusted or corroded.

SUMMARY

The present disclosure provides an integrated unit capable of preventing occurrence of rust, corrosion, and the like on the guide pin.

According to an aspect of the present disclosure, there is provided an integrated unit, including: a drive device; and a control device which is fixed to the drive device and is configured to control the drive device, in which: the control device includes a guide pin protruding toward the drive device; the drive device includes a guide hole through which the guide pin is inserted; the control device is fixed to the drive device with the guide pin inserted through the guide hole; and the drive device includes a protective wall which covers at least a part of the guide pin with the control device fixed to the drive device.

According to the present disclosure, the occurrence of rust, corrosion, and the like on the guide pin can be prevented since the protective wall which covers at least a part of the guide pin can prevent water or the like from adhering to the guide pin.

DESCRIPTION OF EMBODIMENTS

Figure 1:
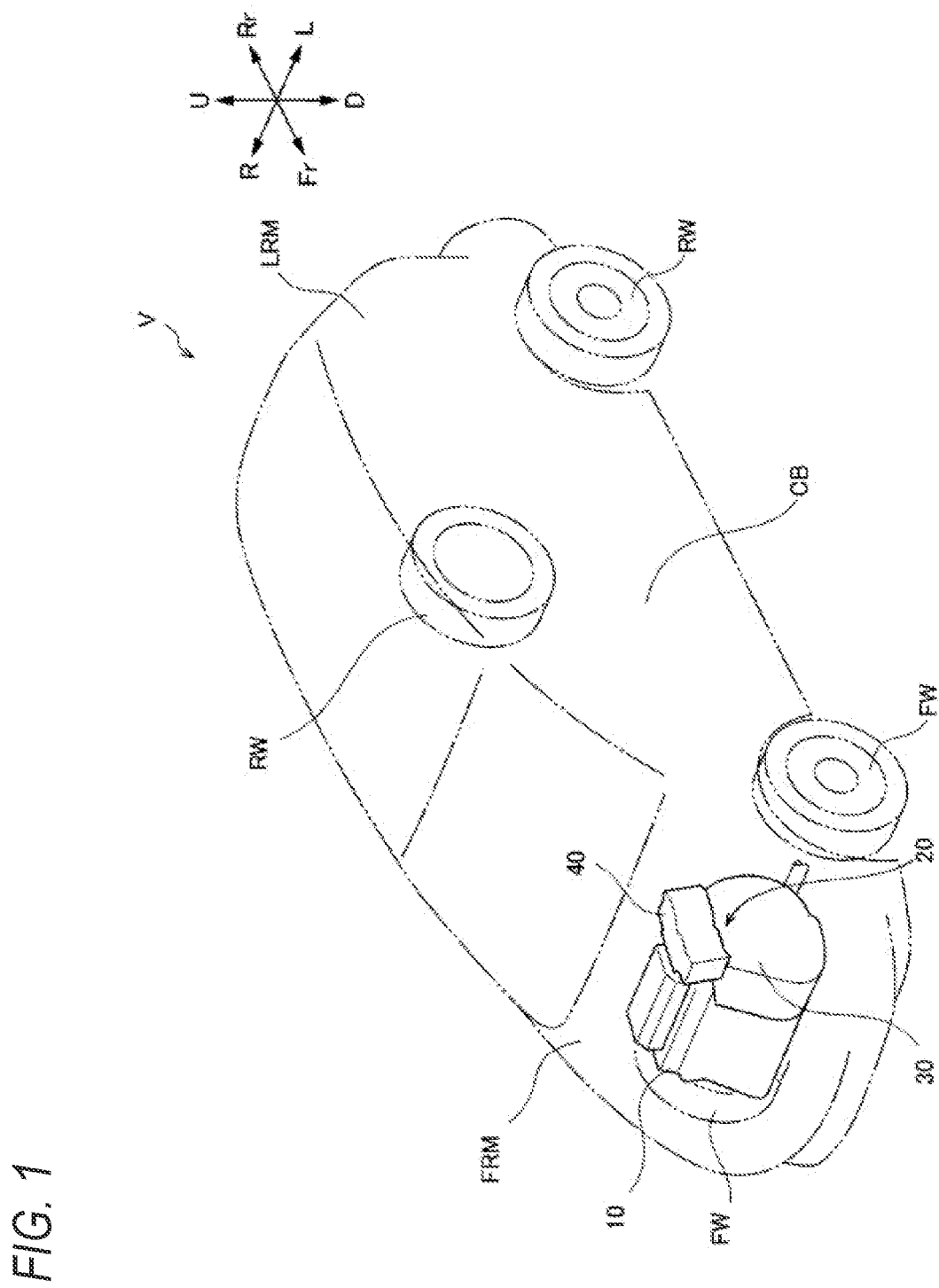
FIG. 1 is a schematic perspective view of a vehicle mounted with an integrated unit according to an embodiment of the present disclosure, as viewed obliquely from an upper side.

A vehicle on which an integrated unit according to an embodiment of the present disclosure is mounted will be described below with reference to the accompanying drawings. Note that the drawings are viewed in the direction of the reference numerals. In the present description and the like, for the sake of simplicity and clarity of explanation, a front-rear direction, a left-right direction, and an up-down direction are described according to directions viewed from a driver of the vehicle on which the integrated unit is mounted, and in the drawings, a front side of the vehicle is illustrated as Fr, a rear side thereof is illustrated as Rr, a left side thereof is illustrated as L, a right side thereof is illustrated as R, an upper side thereof is illustrated as U, and a lower side thereof is illustrated as D. In the present description and the like, the left-right direction is also referred to as a vehicle width direction.

<Vehicle>

As illustrated in FIG. 1, a vehicle V of the present embodiment includes a compartment CB, which is a living space for passengers, a front room FRM provided in front of the compartment CB, and a luggage room LRM provided behind the compartment CB. The compartment CB and the front room FRM are separate spaces partitioned by a dash panel (not illustrated) or the like. In the present embodiment, the luggage room LRM is not partitioned from the compartment CB, and is a space which communicates with the compartment CB. Note that the luggage room LRM and the compartment CB may be separate spaces, or may be partially communicated with each other.

The vehicle V is provided with a pair of front wheels FW at the front side and a pair of rear wheels RW at the rear side.

On the front room FRM of the vehicle V, an engine 10 and an integrated unit 20 are mounted. The engine 10 and the integrated unit 20 are disposed adjacent to each other in the vehicle width direction within the front room FRM. In the present embodiment, the engine 10 and the integrated unit 20 are disposed adjacent to each other in the vehicle width direction within the front room FRM such that the engine 10 is on the right side and the integrated unit 20 is on the left side.

In this way, since the integrated unit 20 is mounted on the front room FRM of the vehicle V, water or the like may splash into the integrated unit 20 from the front side of the vehicle V.

<Integrated Unit>

Figure 2:
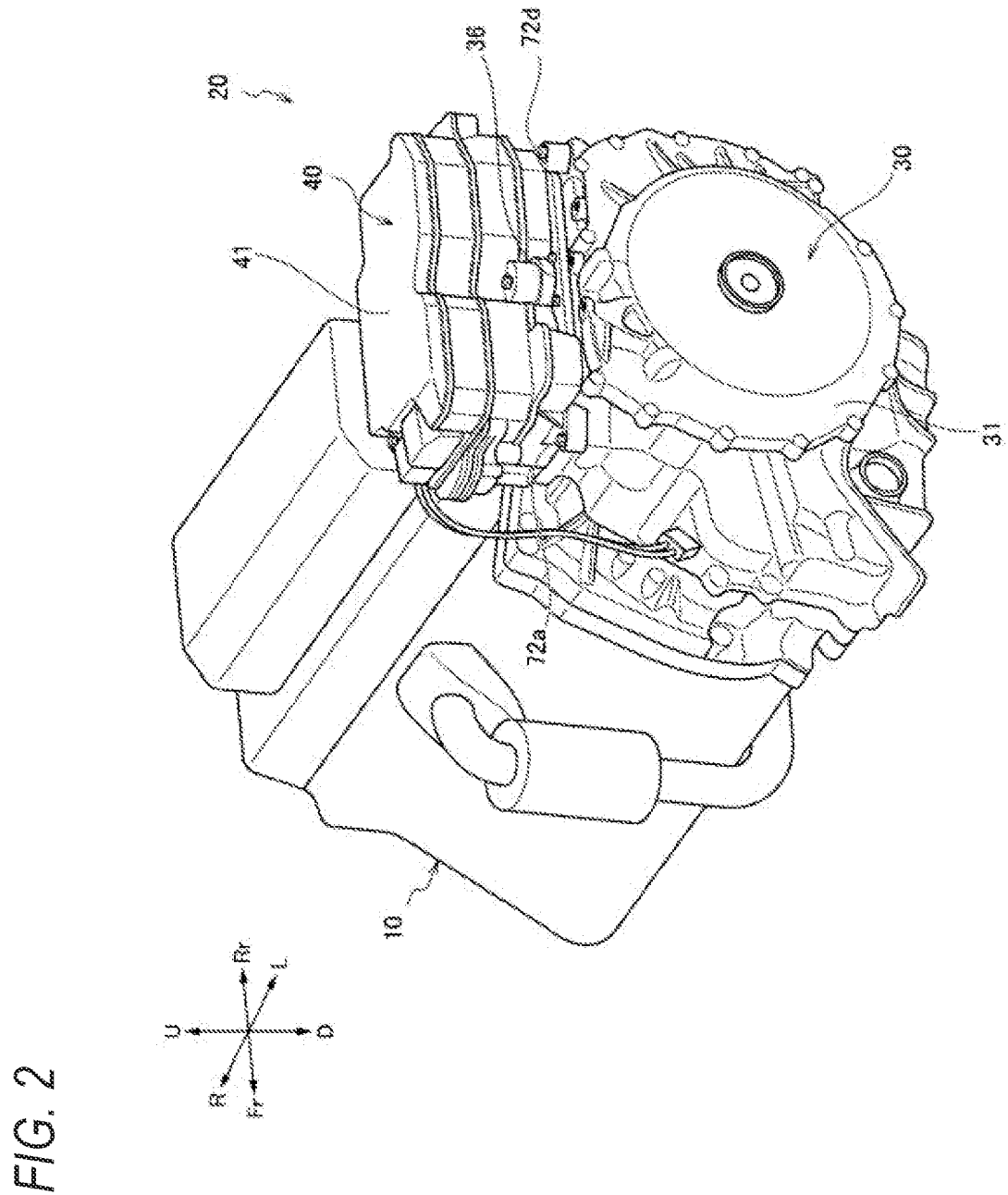
FIG. 2 is a schematic perspective view of the integrated unit of FIG. 1 as viewed obliquely from the upper side.

As illustrated in FIG. 2, the integrated unit 20 of the present embodiment includes a drive device 30 in which a first rotary electric machine MG1 and a second rotary electric machine MG2 are accommodated in a drive device case 31, and a power control unit 40 which controls the first rotary electric machine MG1 and the second rotary electric machine MG2. The power control unit 40 is fixed to an upper portion of the drive device case 31 of the drive device 30. The power control unit 40 is connected between a battery (not illustrated) mounted on the vehicle V and the drive device 30, and converts a DC voltage into an AC voltage or an AC voltage into a DC voltage.

(Drive Device)

Figure 3:
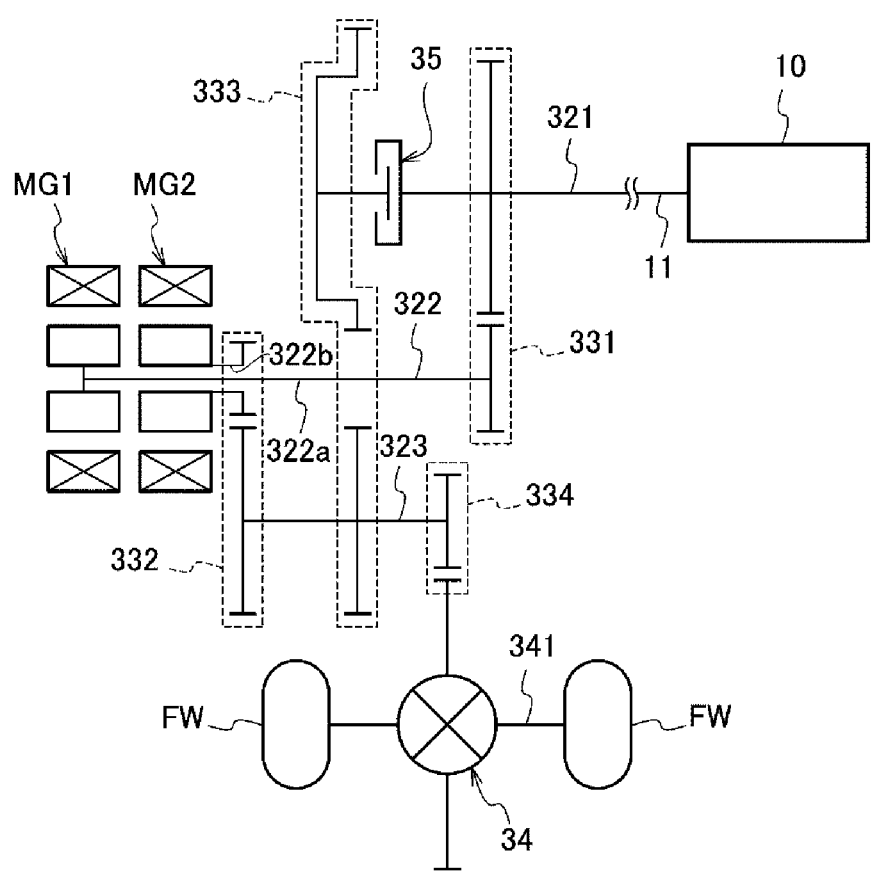
FIG. 3 is a skeleton diagram illustrating a power transmission path in the integrated unit of FIG. 2.

As illustrated in FIG. 3, an input shaft 321, an intermediate shaft 322, and an output shaft 323 are arranged in parallel with each other inside the drive device case 31, and in the intermediate shaft 322, an inner peripheral shaft 322*a* is surrounded by an outer peripheral shaft 322*b* in a relatively rotatable manner. Note that in the following description, an axial direction means a direction parallel to rotation axes of the input shaft 321, the intermediate shaft 322 and the output shaft 323. The integrated unit 20 is disposed in the front room FRM such that the axial direction becomes the vehicle width direction (left-right direction) of the vehicle V.

The input shaft 321 connected to the crankshaft 11 of the engine 10 is connected via a first transmission gear pair 331 to the inner peripheral shaft 322*a* provided with the first rotary electric machine MG1 on an axis thereof. The outer peripheral shaft 322*b* provided with the second rotary electric machine MG2 on an axis thereof is connected via a second transmission gear pair 332 to the output shaft 323, and the input shaft 321 and the output shaft 323 are connected via an engine direct-coupled gear pair 333. The output shaft 323 and a differential device 34 are connected to each other via a final gear pair 334, and the differential device 34 is connected via a differential shaft 341 to the front wheels FW, which are drive wheels. The input shaft 321 is also provided with a clutch 35 which connects or disconnects power transmission between the input shaft 321 and the output shaft 323 via the engine direct-coupled gear pair 333.

The integrated unit 20 configured in this way includes a transmission path which transmits rotational power of the second rotary electric machine MG2 to the front wheels FW, which are the drive wheels, to run the vehicle V, and a transmission path which transmits rotational power of the engine 10 to the front wheels FW, which are the drive wheels, to run the vehicle, and the two transmission paths are alternatively selected or used in combination for running.

Specifically, when using the transmission path which transmits the rotational power of the second rotary electric machine MG2 to the front wheels FW, which are the drive wheels, to run the vehicle, the engine 10 is driven with the clutch 35 released. In this way, the rotational power of the engine 10 input from the input shaft 321 to the inner peripheral shaft 322*a* of the intermediate shaft 322 via the first transmission gear pair 331 rotates the inner peripheral shaft 322*a* and operates the first rotary electric machine MG1 fixed to the inner peripheral shaft 322*a*. As a result, the first rotary electric machine MG1 operates as an electrical generator and generates power using the rotational power of the engine 10. On the other hand, the second rotary electric machine MG2 connected to the outer peripheral shaft 322*b* surrounding the inner peripheral shaft 322*a* in a relatively rotatable manner is supplied with the electric power generated by the first rotary electric machine MG1 and operates as an electric motor, and rotates the outer peripheral shaft 322*b* and transmits the rotational power to the output shaft 323 via the second transmission gear pair 332. The rotational power transmitted from the second rotary electric machine MG2 to the output shaft 323 is transmitted to the front wheels FW, which are the drive wheels, via the final gear pair 334, the differential device 34, and the differential shaft 341. In this way, when the transmission path which transmits the rotational power of the second rotary electric machine MG2 to the front wheels FW, which are the drive wheels, to run the vehicle V is used, in the integrated unit 20, the rotational power of the engine 10 is converted into electric power by the first rotary electric machine MG1, and the electric power generated by the first rotary electric machine MG1 drives the second rotary electric machine MG2 to run the vehicle V, that is, so-called series driving is possible.

Further, when the transmission path which transmits the rotational power of the engine 10 to the front wheels FW, which are drive wheels, to run the vehicle V is used, the engine 10 is driven with the clutch 35 connected. In this way, the rotational power of the engine 10 input from the input shaft 321 is transmitted to the output shaft 323 via the engine direct-coupled gear pair 333, and transmitted to the front wheel FW, which are the drive wheels, via the final gear pair 334, the differential device 34, and the differential shaft 341. In this case, since the input shaft 321 and the inner peripheral shaft 322*a* are always connected to each other via the first transmission gear pair 331, the first rotary electric machine MG1 operates as an electrical generator and generates electric power by the rotational power of the engine 10. Therefore, when the transmission path which transmits the rotational power of the engine 10 to the front wheels FW, which are the drive wheels, to run the vehicle V is used, in the integrated unit 20, by driving the second rotary electric machine MG2 with the electric power generated by the first rotary electric machine MG1, the vehicle V runs using both the rotational power of the engine 10 and the rotational power of the second rotary electric machine MG2, that is, so-called parallel driving is possible. When the transmission path which transmits the rotational power of the engine 10 to the front wheels FW, which are the drive wheels, to run the vehicle V is used, in the integrated unit 20, drag loss is minimized by performing zero torque control on the first rotary electric machine MG1 and the second rotary electric machine MG2, so that it is also possible to run the vehicle V only with the rotational power of the engine 10.

Figure 4:
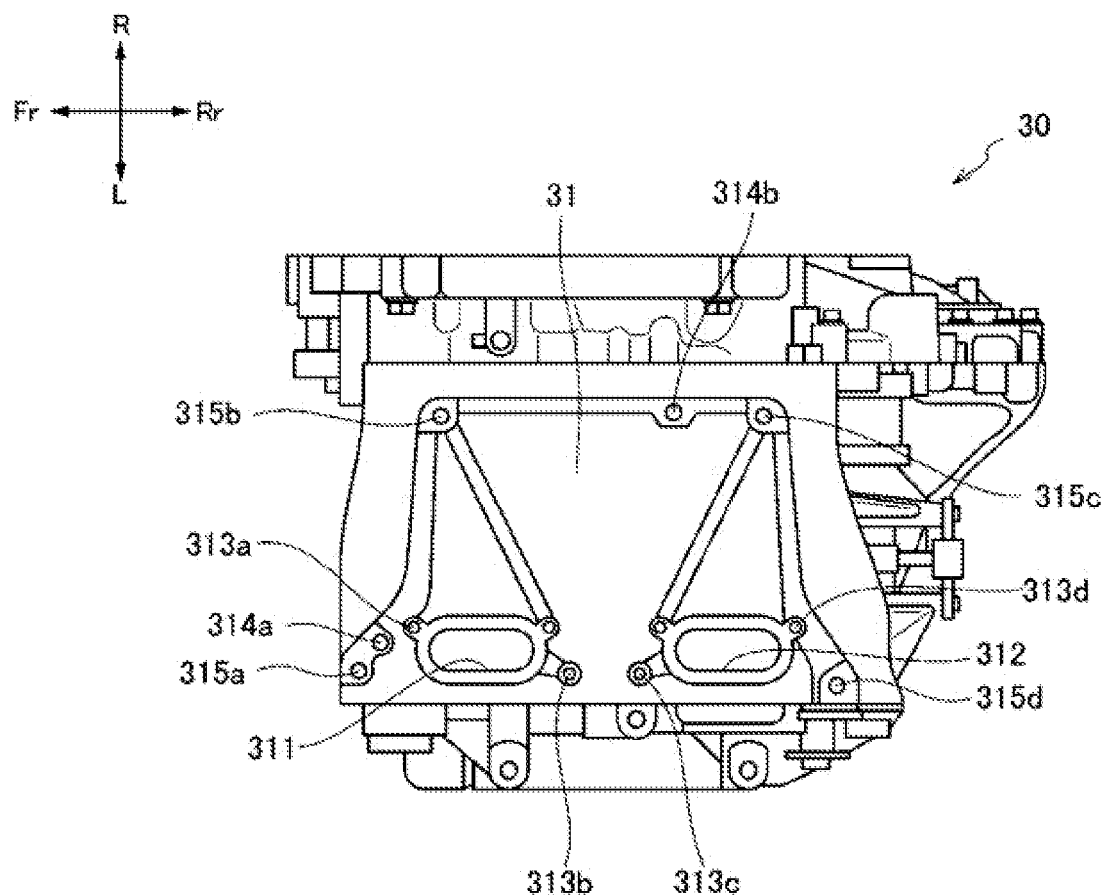
FIG. 4 is a top view of a drive device of the integrated unit of FIG. 2 as viewed from the upper side.
Figure 5:
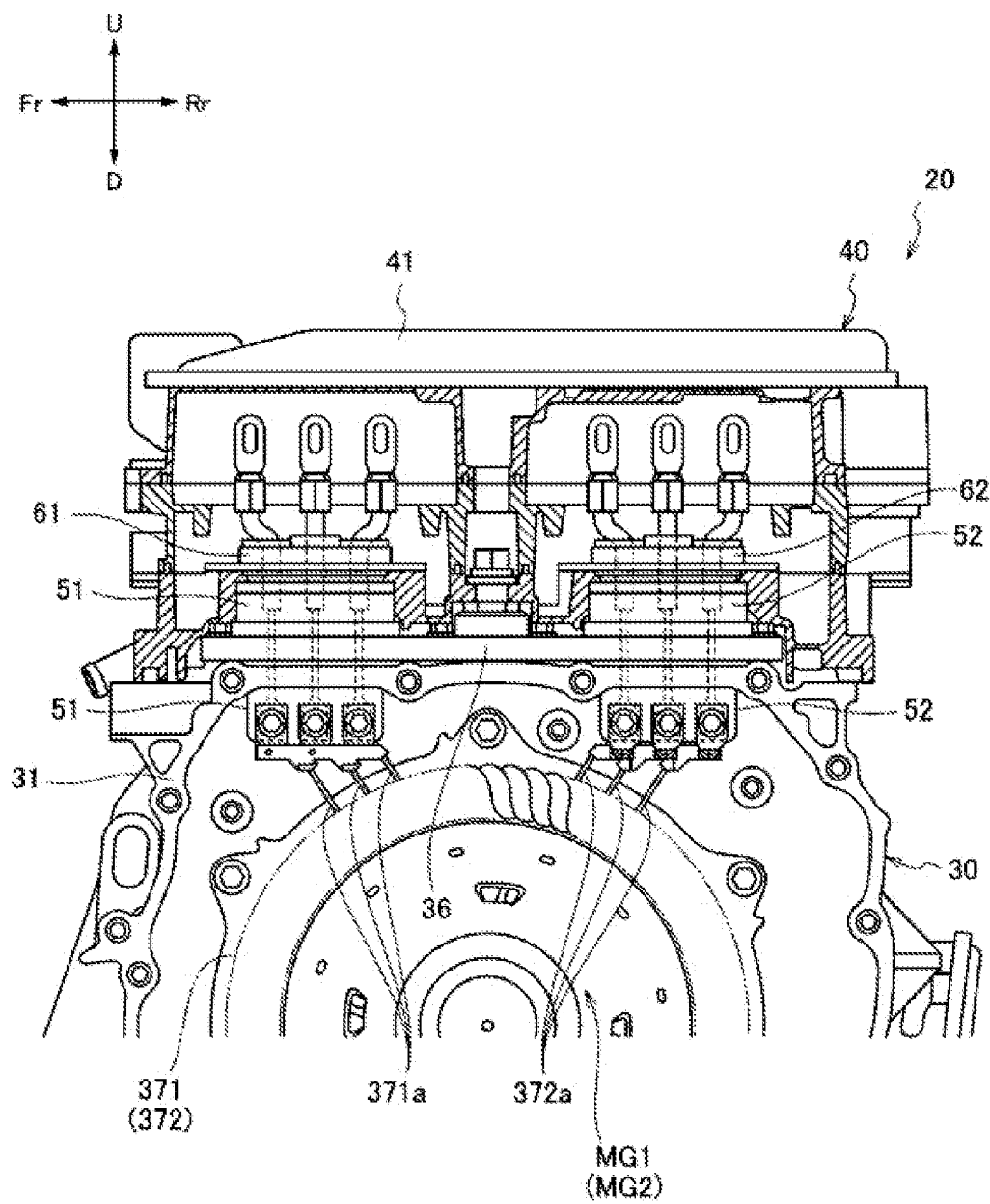
FIG. 5 is a cross-sectional view of main parts illustrating an interior of a drive device case and an interior of a power control unit in the integrated unit of FIG. 2.
Figure 6:
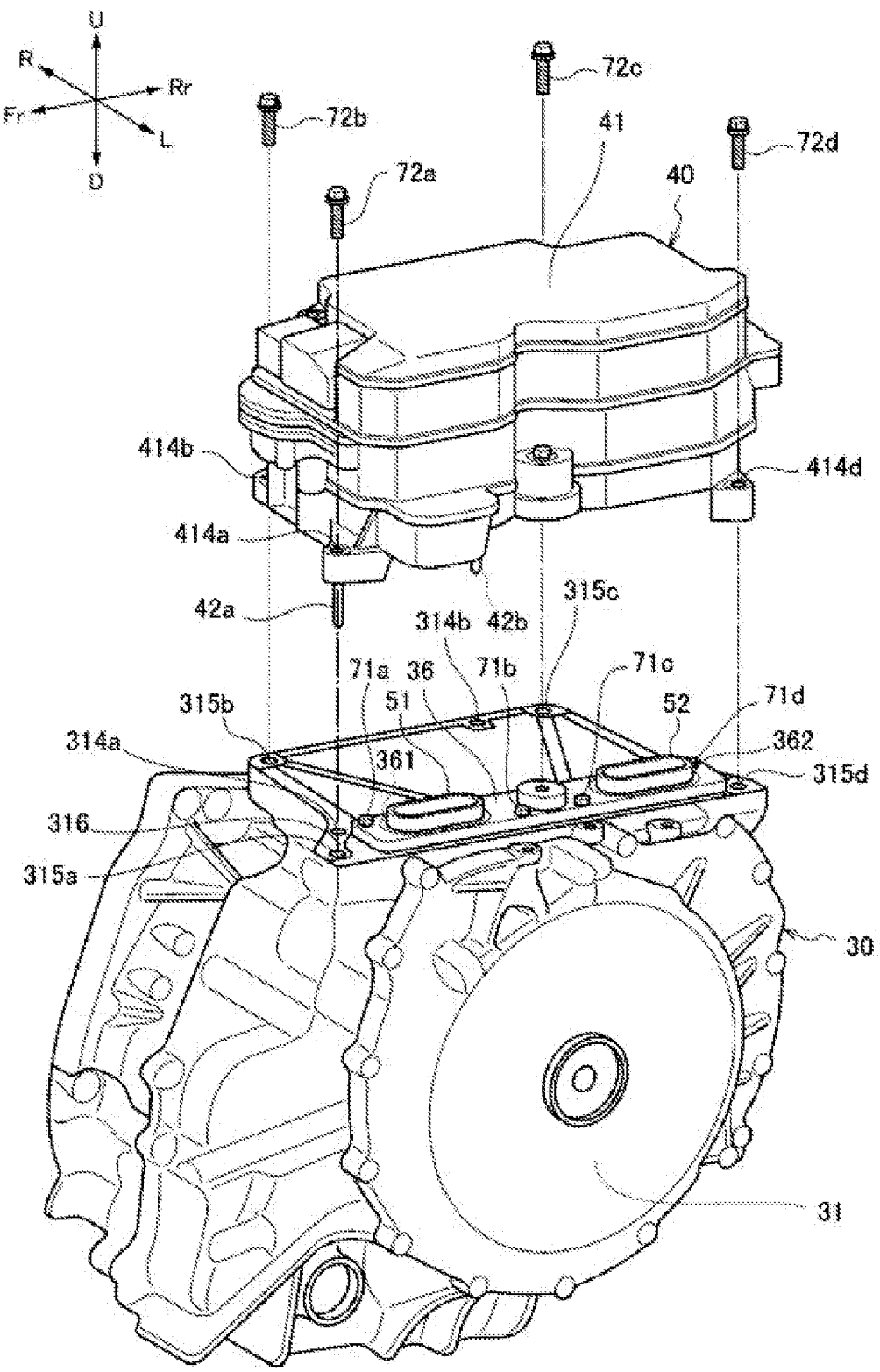
FIG. 6 is an exploded perspective view of the integrated unit of FIG. 2.

As illustrated in FIGS. 4 to 6, an upper surface of the drive device case 31 is formed with a first connector opening 311 through which a first case-side connector 51 is inserted and a second connector opening 312 through which a second case-side connector 52 is inserted. The first connector opening 311 and the second connector opening 312 are formed side by side in the front-rear direction near a left end of the upper surface of the drive device case 31. In the present embodiment, the first connector opening 311 and the second connector opening 312 are formed side by side in the front-rear direction near the left end of the upper surface of the drive device case 31 such that the first connector opening 311 is in the front side and the second connector opening 312 is in the rear side.

The first case-side connector 51 is inserted through the first connector opening 311, and the second case-side connector 52 is inserted through the second connector opening 312. The first case-side connector 51 and the second case-side connector 52 are connected to each other via a plate-shaped connector holding member 36 disposed on the upper surface of the drive device case 31, and are fixed to the drive device case 31 via the connector holding member 36. The connector holding member 36 is formed with a first connector fitting hole 361 into which the first case-side connector 51 is fitted and a second connector fitting hole 362 into which the second case-side connector 52 is fitted. In a state in which the first case-side connector 51 and the second case-side connector 52 are fixed to the drive device case 31 via the connector holding member 36, the first case-side connector 51 is exposed upward from the first connector fitting hole 361 of the connector holding member 36, and the second case-side connector 52 is exposed upward from the second connector fitting hole 362 of the connector holding member 36.

The upper surface of the drive device case 31 is formed with fastening holes 313a, 313b, 313c, and 313d for fixing the connector holding member 36.

The connector holding member 36 is formed with a plurality of through holes which are paired with the fastening holes 313a, 313b, 313c, 313d formed on the upper surface of the drive device case 31. By fastening fastening bolts 71a, 71b, 71c, and 71d to the fastening holes 313a, 313b, 313c, and 313d formed on the upper surface of the drive device case 31 through these through holes, the connector holding member 36 is fixed to the upper surface of the drive device case 31.

Inside the drive device case 31, one ends of a coil 371 of each phase (U phase, V phase, W phase) of the first rotary electric machine MG1 are connected to each other, and the other ends thereof are connected to the first case-side connector 51 as a coil terminal 371a. One ends of a coil 372 of each phase of the second rotary electric machine MG2 are connected to each other, and the other ends thereof are connected to the second case-side connector 52 as a coil terminal 372a. In this way, the first case-side connector 51 is electrically connected to the first rotary electric machine MG1 inside the drive device case 31, and the second case-side connector 52 is electrically connected to the second rotary electric machine MG2 inside the drive device case 31.

(Power Control Unit)

Figure 7:
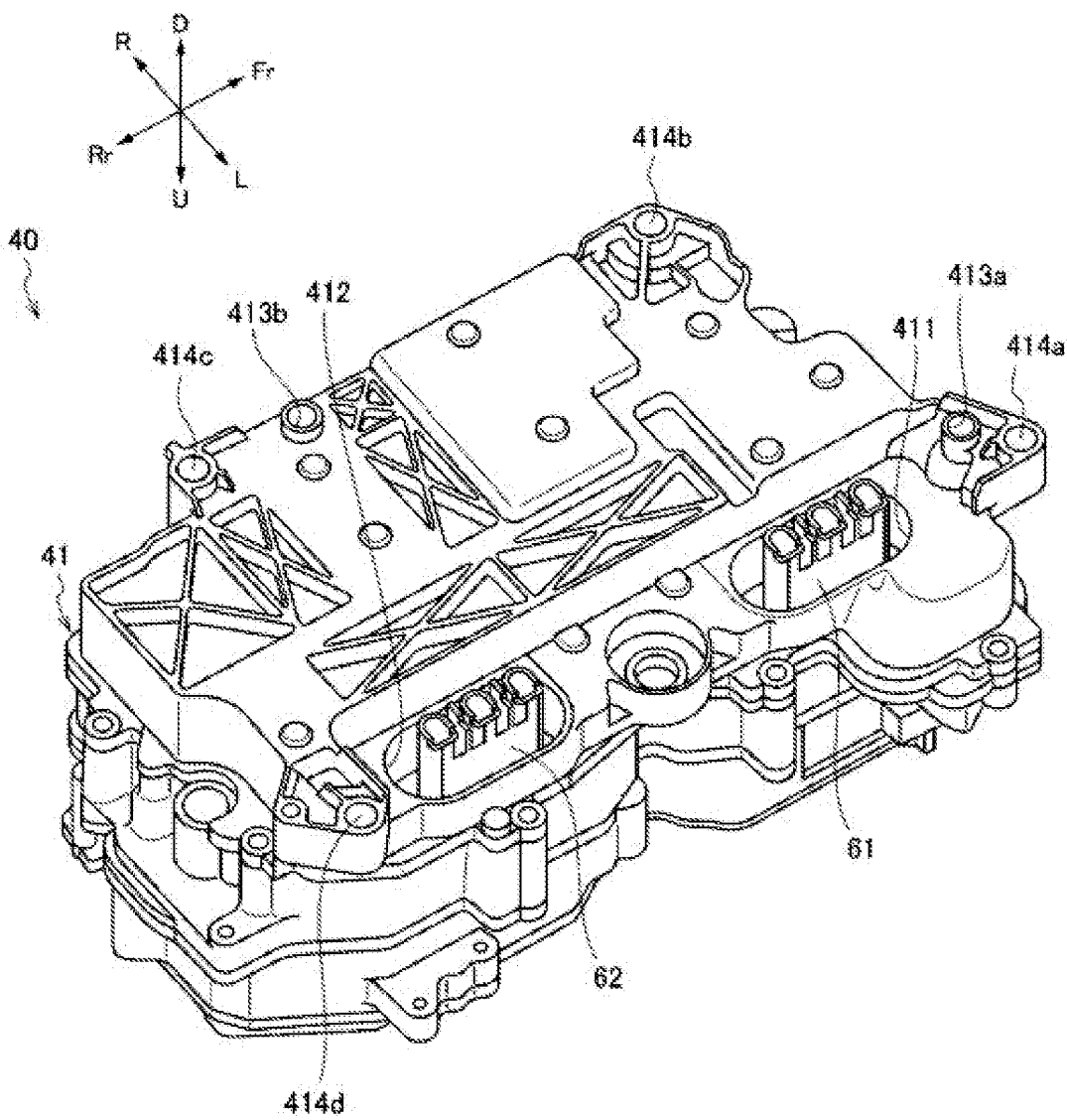
FIG. 7 is a schematic perspective view of the power control unit of the integrated unit of FIG. 2 as viewed obliquely from a lower side.
Figure 8:
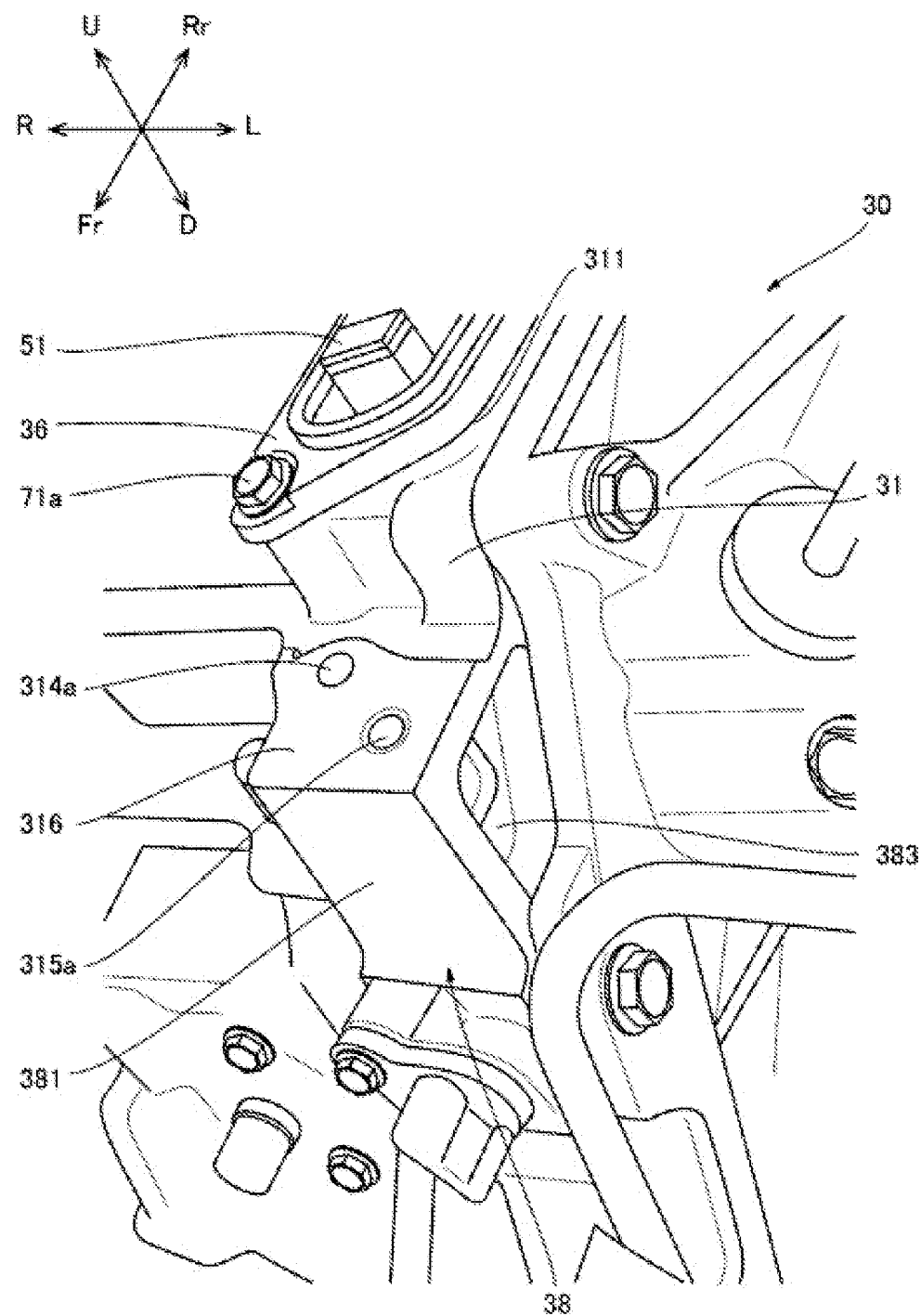
FIG. 8 is an enlarged perspective view of the vicinity of an extending portion of FIG. 6.
Figure 9:
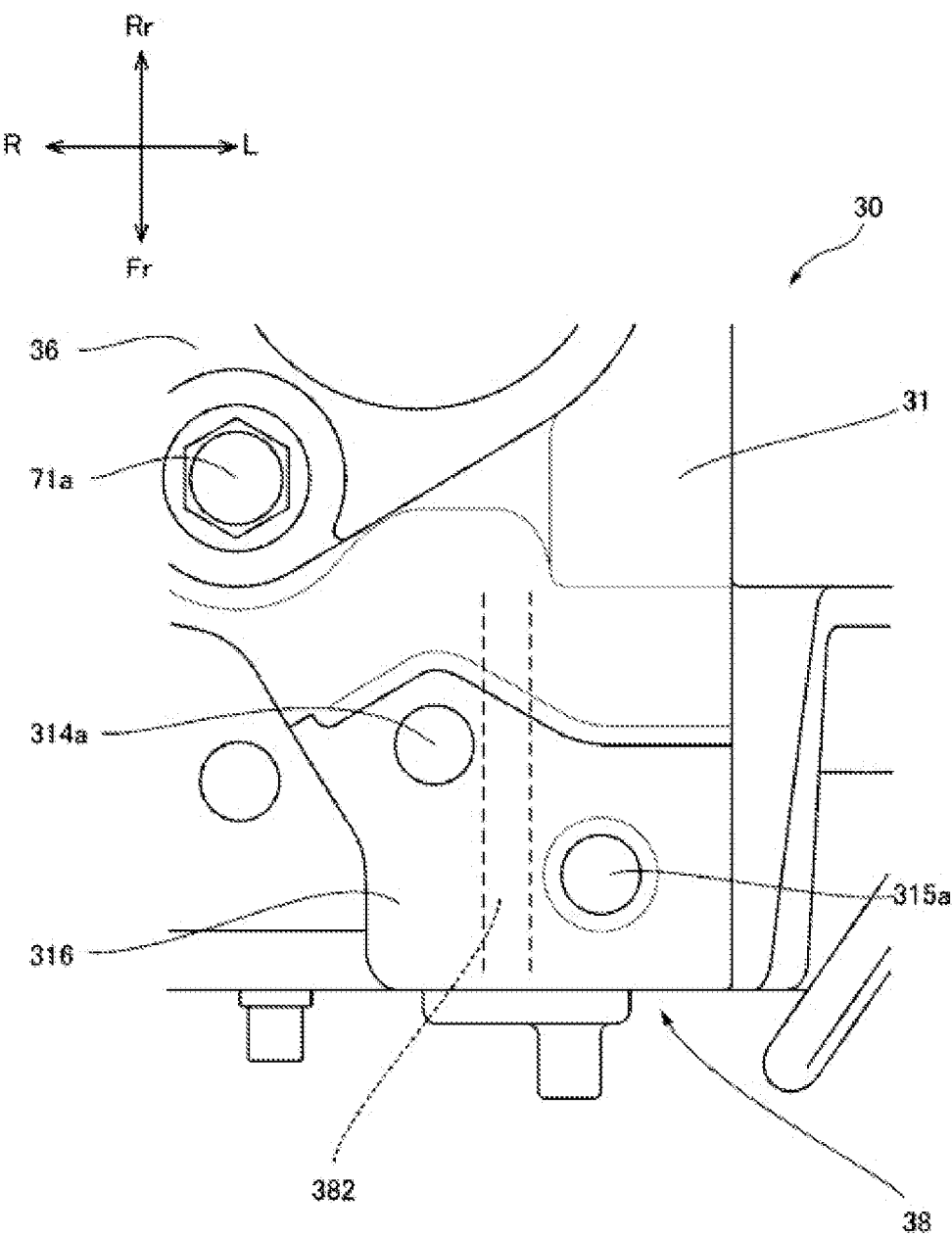
FIG. 9 is a top view of the vicinity of the extending portion of FIG. 8 as viewed from the upper side.
Figure 10:
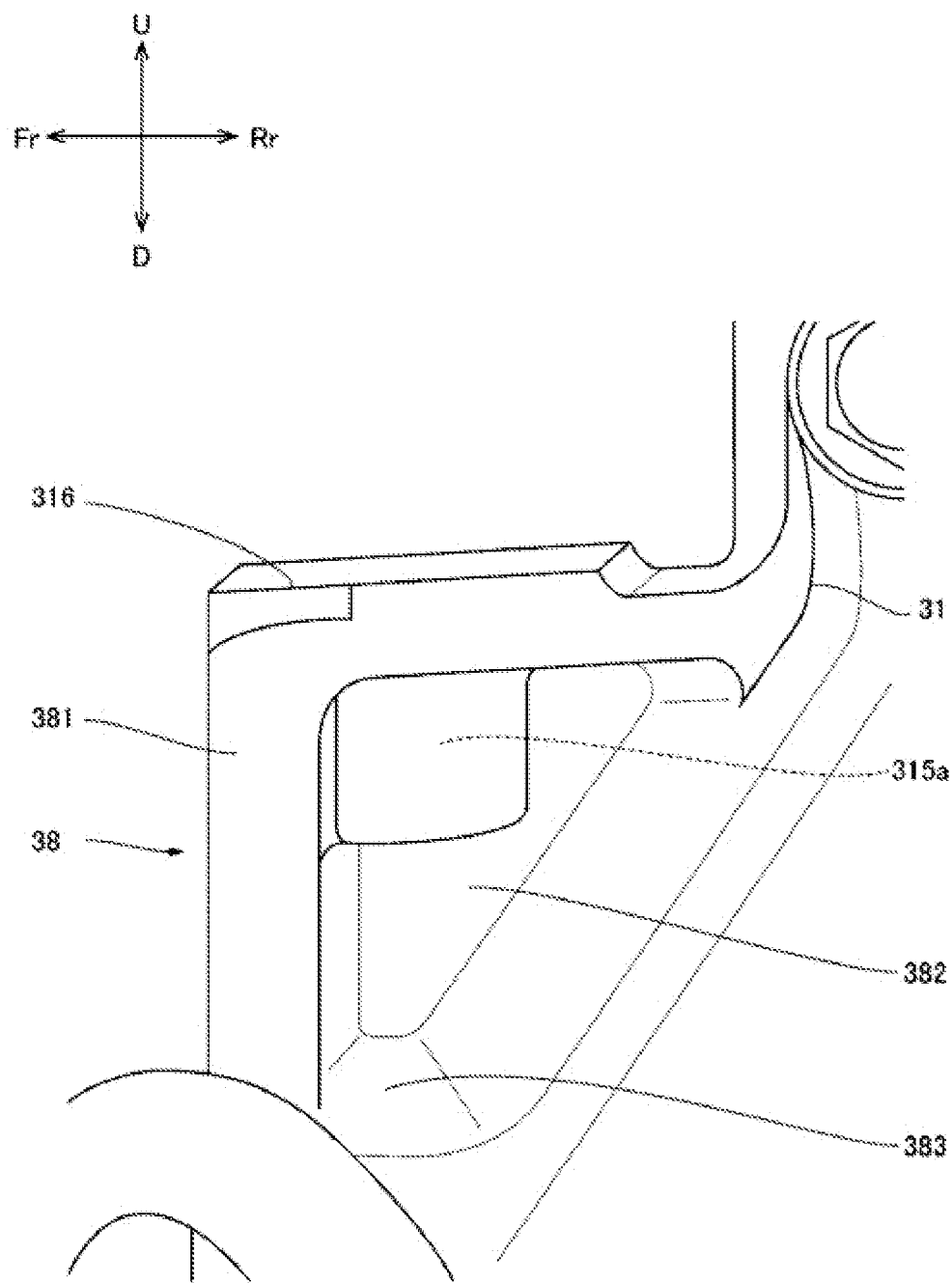
FIG. 10 is a view of the vicinity of a protective wall of FIG. 8 as viewed from a left side.
Figure 11:
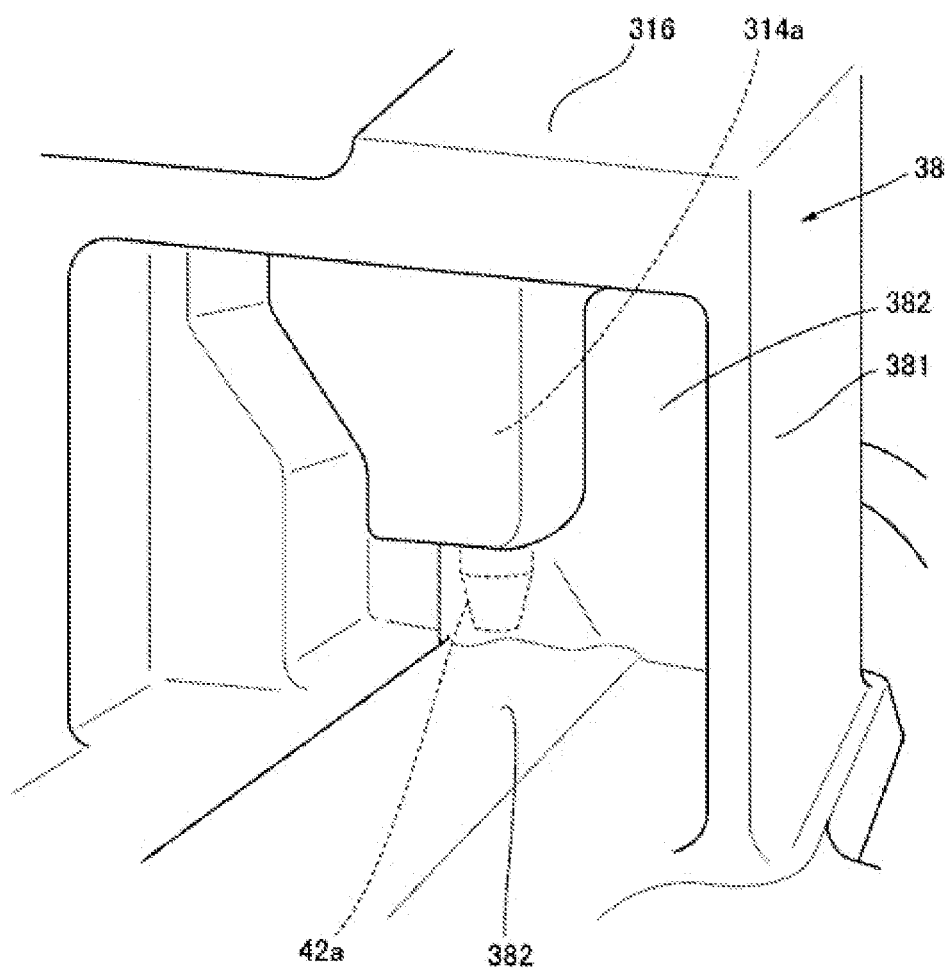
FIG. 11 is a view of the vicinity of the protective wall of FIG. 8 as viewed from a right side.

As illustrated in FIGS. 5 to 7, the power control unit 40 includes an inverter (not illustrated), a voltage control unit (VCU) (not illustrated) controlling the inverter, and various electronic components (not illustrated) such as a current sensor, a smoothing capacitor, and a reactor, inside a substantially box-shaped unit case 41. The inverter includes a first inverter connected between a battery mounted on the vehicle V and the first rotary electric machine MG1 and converting between an AC voltage and a DC voltage, and a second inverter connected between the battery and the second rotary electric machine MG2 and converting between a DC voltage and an AC voltage.

A bottom surface of the unit case 41 is formed with a first connector insertion hole 411 through which a first unit-side connector 61 is inserted and a second connector insertion hole 412 through which a second unit-side connector 62 is inserted. The first connector insertion hole 411 and the second connector insertion hole 412 are formed side by side in the front-rear direction near a left end of the bottom surface of the unit case 41. In the present embodiment, the first connector insertion hole 411 and the second connector insertion hole 412 are formed side by side in the front-rear direction near the left end of the bottom surface of the unit case 41 such that the first connector insertion hole 411 is in the front side and the second connector insertion hole 412 is in the rear side.

The first unit-side connector 61 is inserted through the first connector insertion hole 411, and the second unit-side connector 62 is inserted through the second connector insertion hole 412. The first unit-side connector 61 is exposed downward from the bottom surface of the unit case 41 via the first connector insertion hole 411, and the second unit-side connector 62 is exposed downward from the bottom surface of the unit case 41 via the second connector insertion hole 412.

Inside the unit case 41, the first unit-side connector 61 is electrically connected to the above-described first inverter (not illustrated), and the second unit-side connector 62 is electrically connected to the above-described second inverter (not illustrated).

By electrically connecting the first unit-side connector 61 to the first case-side connector 51 and electrically connecting the second unit-side connector 62 to the second case-side connector 52, the power control unit 40 can control the first rotary electric machine MG1 and the second rotary electric machine MG2.

(Fixation of Power Control Unit to Drive Device)

As illustrated in FIGS. 4 to 7, the bottom surface of the unit case 41 of the power control unit 40 is provided with guide pin fixing holes 413a and 413b. Guide pins 42a and 42b are screwed into the guide pin fixing holes 413a and 413b in a manner of protruding downward toward the drive device 30. The unit case 41 of the power control unit 40 is formed with through holes 414a. 414b, 414c, and 414d through which fastening bolts 72a. 72b, 72c, and 72d are inserted.

On the other hand, guide holes 314a and 314b through which the guide pins 42a and 42b are inserted are provided on an upper portion of the drive device case 31. The upper portion of the drive device case 31 is formed with fastening holes 315a. 315b, 315c, and 315d to which the fastening bolts 72a, 72b, 72c, and 72d which are inserted through the through holes 414a, 414b, 414c, and 414d of the power control unit 40 are fastened. The fastening holes 315a, 315b, 315c, and 315d have a shape recessed downward from the upper surface of the drive device case 31, and thread grooves are processed on inner peripheral surfaces thereof.

When the power control unit 40 is mounted on the upper surface of the drive device case 31, the guide pins 42a and 42b protruding from the bottom surface of the unit case 41 of the power control unit 40 are inserted through the guide holes 314a and 314b of the drive device case 31. The guide pins 42a and 42b and the guide holes 314a and 314b regulate a relative position between the power control unit 40 and the drive device 30.

With the guide pins 42a and 42b inserted through the guide holes 314a and 314b of the drive device case 31 and the power control unit 40 mounted on the upper surface of the drive device case 31, the fastening bolts 72a, 72b, 72c and 72*d* are inserted through the through holes 414*a*, 414*b*, 414*c*, and 414*d* of the power control unit 40 and fastened to the fastening holes 315*a*. 315*b*, 315*c*, and 315*d* of the drive device case 31, so that the power control unit 40 is fixed to the drive device case 31. In this way, with the guide pins 42*a* and 42*b* inserted through the guide holes 314*a* and 314*b* of the drive device case 31, the fastening bolts 72*a*, 72*b*, 72*c* and 72*d* are fastened to the fastening holes 315*a*, 315*b*. 315*c* and 315*d* of the drive device case 31, so that the power control unit 40 is fixed to the drive device 30.

As illustrated in FIGS. 8 to 11, the guide hole 314*a* and the fastening hole 315*a* provided on the drive device case 31 are provided on an extending portion 316 which extends forward and formed on a left front portion of the drive device case 31, and are disposed side by side in the vehicle width direction. In the present embodiment, the guide hole 314*a* and the fastening hole 315*a* are disposed side by side in the vehicle width direction such that the guide hole 314*a* is on the right side and the fastening hole 315*a* is on the left side.

In the present embodiment, the guide hole 314*a* extends downward from the extending portion 316 in a cylindrical shape and has an open lower end. The fastening hole 315*a* has a bottomed cylindrical shape recessed downward from the extending portion 316, and a lower end thereof is closed. A thread groove is processed on the inner peripheral surface of the fastening hole 315*a*.

In a state in which the power control unit 40 is fixed to the drive device 30, the guide pin 42*a* of the power control unit 40 is inserted through the guide hole 314*a* provided on the drive device case 31, and a tip of the guide pin 42*a* is exposed from the lower side of the guide hole 314*a*.

The drive device 30 includes a protective wall 38 which covers at least a part of the guide pin 42*a* with the power control unit 40 fixed to the drive device 30. In the present embodiment, the protective wall 38 is formed on a front surface of the drive device case 31.

As a result, even when the guide pin 42*a* is exposed from the guide hole 314*a*, the protective wall 38 which covers at least a part of the guide pin 42*a* can prevent water or the like from adhering to the guide pin 42*a*, so that it is possible to prevent occurrence of rust, corrosion, and the like on the guide pin 42*a*.

Furthermore, the protective wall 38 is formed in front of the first connector opening 311 formed on the drive device case 31. Specifically, the extending portion 316 is formed at a position where at least a part of the extending portion 316 overlaps the first connector opening 311 in the vehicle width direction, and the protective wall 38 is formed on the front surface of the drive device case 31 such that at least a part of the protective wall 38 overlaps the first connector opening 311 in the vehicle width direction and is positioned in front of the first connector opening 311.

The protective wall 38 includes a front wall portion 381 which covers the front side of the guide pin 42*a* and the fastening hole 315*a*, a side wall portion 382 which covers the left side of the guide pin 42*a*, and a lower wall portion 383 which covers the lower side of the guide pin 42*a* and the fastening hole 315*a*.

As described above, since the integrated unit 20 is mounted on the front room FRM of the vehicle V, water or the like tends to splash into the integrated unit 20 from the front side of the vehicle V. In the present embodiment, even when the guide pin 42*a* is exposed from the guide hole 314*a*, the front wall portion 381 which covers the guide pin 42*a* from the front side of the vehicle can prevent water or the like splashing from the front side of the vehicle V from adhering to the guide pin 42*a*, so that it is possible to further prevent the occurrence of rust, corrosion, and the like on the guide pin 42*a*. Even when the guide pin 42*a* is exposed from the guide hole 314*a*, the side wall portion 382 which covers the left side of the guide pin 42*a*, that is, an outer side of the guide pin 42*a* in the vehicle width direction can prevent water or the like splashing from a lateral side of the vehicle V from adhering to the guide pin 42*a*, so that it is possible to further prevent the occurrence of rust, corrosion, and the like on the guide pin 42*a*. Even when the guide pin 42*a* is exposed from the guide hole 314*a*, the lower wall portion 383 which covers the guide pin 42*a* from the lower side can prevent water or the like splashing from the lower side of the vehicle V from adhering to the guide pin 42*a*, so that it is possible to further prevent the occurrence of rust, corrosion, and the like on the guide pin 42*a*. Furthermore, even when the guide pin 42*a* falls off from the integrated unit 20, it can be stopped by the lower wall portion 383 which covers the lower side of the guide pin 42*a*, and therefore, it is possible to prevent the guide pin 42*a* from dropping into the front room FRM of the vehicle V, the dropped guide pin 42*a* from colliding with other devices accommodated in the front room FRM and damaging other devices accommodated in the front room FRM.

The front wall portion 381 extends downward from a front edge of the extending portion 316. The lower wall portion 383 extends rearward from a lower edge of the front wall portion 381 and is connected to the drive device case 31. The side wall portion 382 is provided between the guide hole 314*a* and the fastening hole 315*a* in the vehicle width direction, extends forward from the drive device case 31 and extends in the front-rear direction of the vehicle, and includes an upper edge connected to the extending portion 316, a lower edge connected to the lower wall portion 383, and a front edge connected to the front wall portion 381.

In this way, since the front wall portion 381 covers the guide pin 42*a* and the fastening hole 315*a* from the front side of the vehicle with the power control unit 40 fixed to the drive device 30, when other devices and the like accommodated in the front room FRM are displaced from the front side toward the guide pin 42*a* and the fastening hole 315*a*, such as when the vehicle V has a frontal collision, the front wall portion 381 can prevent the guide pin 42*a* and the fastening hole 315*a* from being damaged.

Since the side wall portion 382 is provided between the guide hole 314*a* and the fastening hole 315*a* in the vehicle width direction, the guide hole 314*a* and the fastening hole 315*a* are disposed near the side wall portion 382 on one side in the vehicle width direction and the other side in the vehicle width direction with the side wall portion 382 interposed therebetween. In the present embodiment, the guide hole 314*a* is positioned on the right side of the side wall portion 382 and the fastening hole 315*a* is positioned on the left side of the side wall portion 382, and both are positioned near the side wall portion 382.

Since the side wall portion 382 extends forward from the drive device case 31 and extends in the front-rear direction of the vehicle, rigidity thereof in the front-rear direction of the vehicle is high. Therefore, the side wall portion 382 can increase the rigidity thereof in the front-rear direction of the vehicle near the guide hole 314*a* and the fastening hole 315*a* in the drive device case 31 of the drive device 30. Therefore, even when other devices and the like accommodated in the front room FRM are displaced from the front side toward the guide hole 314*a* and the fastening hole 315*a* and collide with the protective wall 38, such as when the vehicle V has a frontal collision, with the power control unit 40 fixed to the drive device 30, an amount of deformation near the guide hole 314a and the fastening hole 315a can be reduced, and damage to the guide pin 42a inserted through the guide hole 314a and the fastening hole 315a can be prevented.

Further, due to the first connector opening 311 formed on the drive device case 31, rigidity of the drive device case 31 near the first connector opening 311 tends to be low. In the present embodiment, the protective wall 38 is formed in front of the first connector opening 311 formed on the drive device case 31, so that the rigidity of the drive device case 31 near the first connector opening 311 can be prevented from reducing.

Although an embodiment of the present disclosure has been described above with reference to the accompanying drawings, it is needless to say that the present invention is not limited to the embodiment. It is apparent that those skilled in the art can conceive of various modifications and changes within the scope described in the claims, and it is understood that such modifications and changes naturally fall within the technical scope of the present invention. In addition, respective constituent elements in the above embodiments may be freely combined without departing from the gist of the invention.

For example, in the present embodiment, the drive device 30 includes the intermediate shaft 322 including the inner peripheral shaft 322a surrounded by the outer peripheral shaft 322b in a manner of being relatively rotatable to each other, and the first rotary electric machine MG1 and the second rotary electric machine MG2 have coaxial rotating axes, but the first rotary electric machine MG1 and the second rotary electric machine MG2 may have different rotating axes parallel to each other instead of coaxial rotating axes.

Furthermore, for example, in the present embodiment, the first connector opening 311 and the second connector opening 312 are formed side by side in the front-rear direction near the left end of the upper surface of the drive device case 31 such that the first connector opening 311 is in the front side and the second connector opening 312 is in the rear side, but the first connector opening 311 and the second connector opening 312 may also be formed side by side in the front-rear direction near the left end of the upper surface of the drive device case 31 such that the second connector opening 312 is in the front side and the first connector opening 311 is in the rear side. Moreover, the protective wall 38 may be formed in front of the second connector opening 312 formed on the drive device case 31. Specifically, the extending portion 316 may be formed at a position where at least a part of the extending portion 316 overlaps the second connector opening 312 in the vehicle width direction, and the protective wall 38 may be formed on the front surface of the drive device case 31 such that at least a part of the protective wall 38 overlaps the second connector opening 312 in the vehicle width direction and is positioned in front of the second connector opening 312.

For example, in the present embodiment, the vehicle V includes the engine 10, and the integrated unit 20 includes the transmission path which transmits the driving force of the second rotary electric machine MG2 to the front wheels FW, which are the drive wheels, to run the vehicle V, and the transmission path which transmits the driving force of the engine 10 to the front wheels FW, which are the drive wheels, to run the vehicle, but the vehicle V may not include the engine 10, and the drive device 30 of the integrated unit 20 may not include the first rotary electric machine MG1. In that case, the first connector opening 311 and the first case-side connector 51 of the drive device 30 and the first unit-side connector 61 of the power control unit 40 can be omitted, and the second connector opening 312 may be formed at the position of the first connector opening 311 on the upper surface of the drive device case 31 instead of the first connector opening 311. Moreover, the protective wall 38 may be formed in front of the second connector opening 312.

In the present description, at least the following matters are described. In the parentheses, the corresponding constituent elements and the like in the above embodiments are shown as an example, but the present invention is not limited thereto.

(1) An integrated unit (integrated unit 20), including:
a drive device (drive device 30); and
a control device (power control unit 40) which is fixed to the drive device and is configured to control the drive device, in which:
the control device includes a guide pin (guide pin 42a) protruding toward the drive device;
the drive device includes a guide hole (guide hole 314a) through which the guide pin is inserted;
the control device is fixed to the drive device with the guide pin inserted through the guide hole; and
the drive device includes a protective wall (protective wall 38) which covers at least a part of the guide pin with the control device fixed to the drive device.

According to (1), the occurrence of rust, corrosion, and the like on the guide pin can be prevented since the protective wall which covers at least a part of the guide pin can prevent water from adhering to the guide pin.

(2) The integrated unit according to (1), in which:
the integrated unit is mounted on a front room (front room FRM) of a vehicle (vehicle V); and
the protective wall includes:
a front wall portion (front wall portion 381) which covers the guide pin from a front side of the vehicle with the control device fixed to the drive device; and
a side wall portion (side wall portion 382) which covers the guide pin from an outer side in a vehicle width direction, with the control device fixed to the drive device.

According to (2), the occurrence of rust, corrosion, and the like on the guide pin can be further prevented since the front wall portion which covers the guide pin from the front side of the vehicle can prevent water or the like splashing from the front side of the vehicle from adhering to the guide pin. The occurrence of rust, corrosion, and the like on the guide pin can be further prevented since the side wall portion which covers the guide pin from the outer side in the vehicle width direction can prevent water or the like splashing from the lateral side of the vehicle from adhering to the guide pin.

(3) The integrated unit according to (2), in which:
the drive device includes a fastening hole (fastening hole 315a) into which a fastening member (fastening bolt 72a) fixing the control device to the drive device is fastened:
the control device is fixed to the drive device by fastening the fastening member to the fastening hole with the guide pin inserted through the guide hole;
the guide hole and the fastening hole are disposed side by side in the vehicle width direction;
the front wall portion covers the guide pin and the fastening hole from the front side of the vehicle with the control device fixed to the drive device; and
the side wall portion is provided between the guide hole and the fastening hole in the vehicle width direction and extends in a front-rear direction of the vehicle.

According to (3), since the front wall portion covers the guide pin and the fastening hole from the front side of the vehicle with the control device fixed to the drive device, when other devices and the like accommodated in the front room are displaced from the front side toward the guide pin and the fastening hole, such as when the vehicle has a frontal collision, the front wall portion can prevent the guide pin and the fastening hole from being damaged. Moreover, since the side wall portion is provided between the guide hole and the fastening hole in the vehicle width direction and extends in the front-rear direction of the vehicle, even when other devices and the like accommodated in the front room are displaced from the front side toward the guide hole and the fastening hole and collide with the protective wall, such as when the vehicle has a frontal collision, with the control device fixed to the drive device, an amount of deformation near the guide hole and the fastening hole can be reduced, and damage to the guide pin inserted through the guide hole and the fastening hole can be prevented.

(4) The integrated unit according to (2) or (3), in which:
the drive device includes a rotary electric machine (first rotary electric machine MG1) and a drive device case (drive device case 31) which accommodates the rotary electric machine;
the guide hole and the protective wall are formed on the drive device case;
the drive device case is formed with a connector opening (first connector opening 311) into which a connector (first case-side connector 51) which electrically connects the rotary electric machine and the control device is fitted; and
the protective wall is provided on the front side of the vehicle with respect to the connector opening.

According to (4), the protective wall is formed in front of the connector opening formed on the drive device case, so that the rigidity of the drive device case near the connector opening can be prevented from reducing.

What is claimed is:

1. An integrated unit, comprising:
a drive device; and
a control device which is fixed to the drive device and is configured to control the drive device, wherein:
the control device includes a guide pin protruding toward the drive device;
the drive device includes a guide hole through which the guide pin is inserted;
the control device is fixed to the drive device with the guide pin inserted through the guide hole;
the drive device includes a protective wall which covers at least a part of the guide pin with the control device fixed to the drive device, and a connector opening into which a connector which electrically connects the drive device and the control device is fitted;
the integrated unit is mounted on a front room of a vehicle; and
the protective wall is provided on a front side of the vehicle with respect to the connector opening.

2. The integrated unit according to claim 1, wherein:
the protective wall includes:
a front wall portion which covers the guide pin from the front side of the vehicle with the control device fixed to the drive device; and
a side wall portion which covers the guide pin from an outer side in a vehicle width direction with the control device fixed to the drive device.

3. The integrated unit according to claim 2, wherein:
the drive device includes a fastening hole into which a fastening member fixing the control device to the drive device is fastened;
the control device is fixed to the drive device by fastening the fastening member to the fastening hole with the guide pin inserted through the guide hole;
the guide hole and the fastening hole are disposed side by side in the vehicle width direction;
the front wall portion covers the guide pin and the fastening hole from the front side of the vehicle with the control device fixed to the drive device; and
the side wall portion is provided between the guide hole and the fastening hole in the vehicle width direction and extends in a front-rear direction of the vehicle.

4. The integrated unit according to claim 2, wherein:
the drive device includes a rotary electric machine and a drive device case which accommodates the rotary electric machine;
the guide hole and the protective wall are formed on the drive device case; and
the drive device case is formed with the connector opening.

5. The integrated unit according to claim 3, wherein:
the drive device includes a rotary electric machine and a drive device case which accommodates the rotary electric machine;
the guide hole and the protective wall are formed on the drive device case; and
the drive device case is formed with the connector opening.

6. An integrated unit, comprising:
a drive device; and
a control device which is fixed to the drive device and is configured to control the drive device,
wherein:
the control device includes a guide pin protruding toward the drive device;
the drive device includes a guide hole through which the guide pin is inserted;
the control device is fixed to the drive device with the guide pin inserted through the guide hole;
the drive device includes a protective wall which covers at least a part of the guide pin with the control device fixed to the drive device;
the drive device includes a fastening hole into which a fastening member fixing the control device to the drive device is fastened;
the guide hole and the fastening hole are disposed side by side in a vehicle width direction; and
the protective wall covers the guide pin and the fastening hole from a front side of a vehicle with the control device fixed to the drive device, and is provided between the guide hole and the fastening hole in the vehicle width direction and extends in a front-rear direction of the vehicle.

* * * * *